United States Patent [19]

Perkins

[11] Patent Number: 4,541,276
[45] Date of Patent: Sep. 17, 1985

[54] CONTENTS GAGE

[75] Inventor: Warren E. Perkins, Port St. Lucie, Fla.

[73] Assignee: CRYO₂ Corporation, Fort Pierce, Fla.

[21] Appl. No.: 519,597

[22] Filed: Aug. 2, 1983

[51] Int. Cl.⁴ ............................................ G01K 23/20
[52] U.S. Cl. .................................. 73/296; 128/201.21; 177/208
[58] Field of Search ............... 73/296; 177/165, 170, 177/208; 128/201.21

[56] References Cited
U.S. PATENT DOCUMENTS

| | | | |
|---|---|---|---|
| 1,087,958 | 2/1914 | Leavitt | 73/296 X |
| 2,015,689 | 10/1935 | Odell | 73/296 |
| 2,040,357 | 5/1936 | Chalatow | 73/296 |
| 2,467,365 | 4/1949 | Annin | 73/296 |
| 3,396,808 | 8/1968 | Petrea | 177/165 |
| 3,463,258 | 8/1969 | Meier | 177/165 |
| 3,677,356 | 7/1972 | Goodwin | 177/208 X |
| 3,888,321 | 6/1975 | Wiiki et al. | 177/165 |
| 4,211,086 | 7/1980 | Leonard et al. | 128/201.21 X |
| 4,306,629 | 12/1981 | Powell | 177/208 X |
| 4,413,515 | 11/1983 | Quinn | 73/296 |

*Primary Examiner*—Daniel M. Yasich
*Attorney, Agent, or Firm*—Roland H. Shubert

[57] ABSTRACT

The fluid contents of a closed container, particularly a closed cryogen container, are gauged by lifting the container through a lever arm one end of which acts upon a pressure transducer coupled to indicating means while the other end of the arm is spring biased to suppress the empty or tare weight of the container.

26 Claims, 4 Drawing Figures

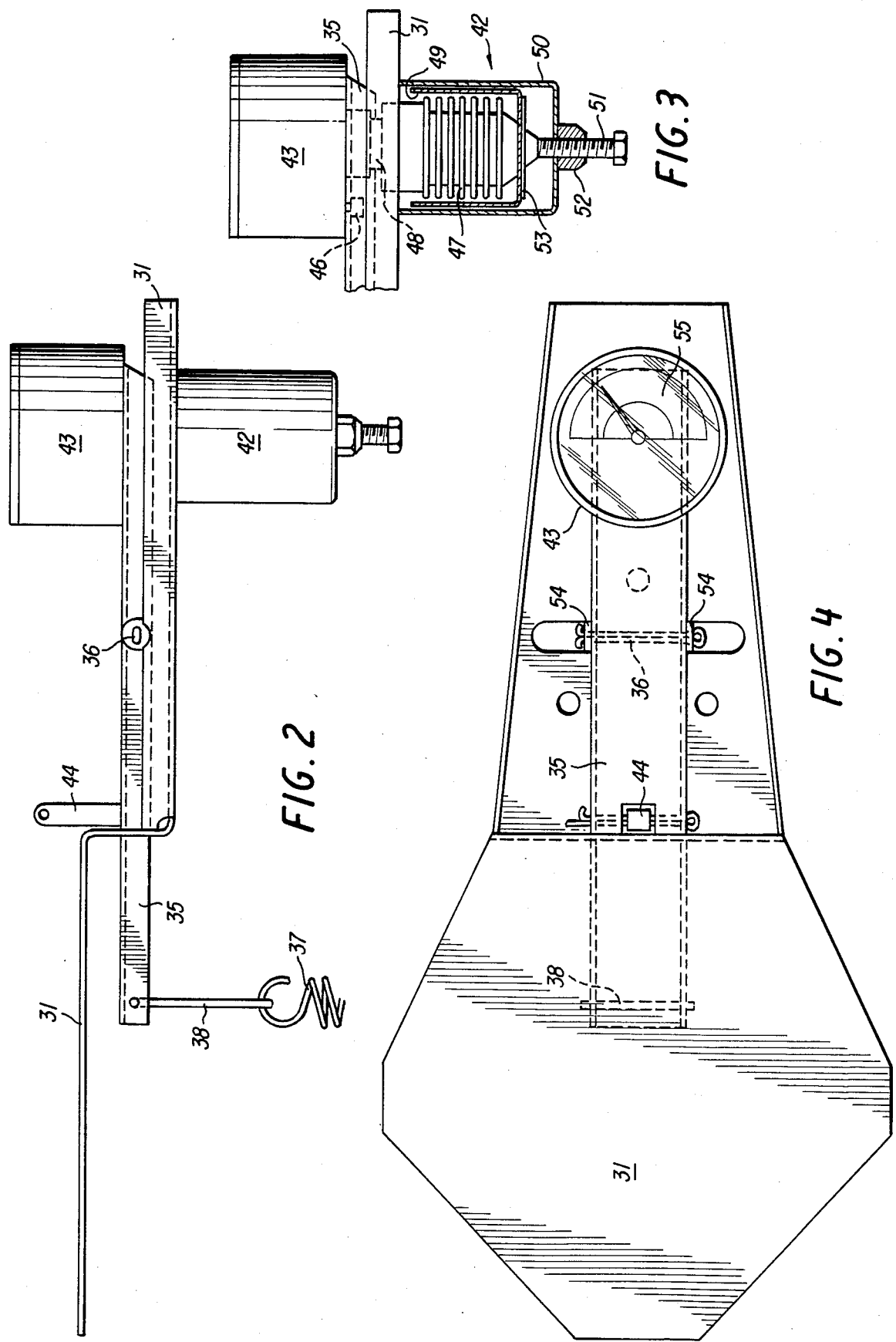

CONTENTS GAGE

BACKGROUND OF THE INVENTION

This invention relates generally to a method and means for gauging the fluid contents of a closed container.

In a specific embodiment, this invention relates to a method and means for gauging the level of liquid oxygen contained within a portable, liquid oxygen therapy unit.

There have been developed a number of commercially available liquid oxygen therapy systems, both stationary and portable, to provide supplemental oxygen for persons of impaired breathing ability. Capacity of the portable systems is governed primarily by weight considerations but they are typically sized to provide about three to about fourteen hours of continuous oxygen supply. This capacity is adequate for a person working normal hours and for shopping, visiting and other short trips. In preparation for use, a portable unit is typically filled with liquid oxygen from a larger, stationary home unit.

It is important to the user of such a portable system that he be able to check at will the oxygen level within the unit. As can be appreciated, an unexpected exhaustion of the oxygen supply could create a serious problem or even provoke a medical crisis for the user. With experience, a user can project with some accuracy the time a filled unit will last him. However, portable therapy units typically are arranged for selection of oxygen delivery rates over a rather broad range. If the oxygen delivery rate is changed during the use period, this will throw time projections awry.

One approach that is used to determine the oxygen level within such portable units is to weigh the entire unit, subtract from the weight obtained the empty, or tare, weight of the container, and thus obtain the weight of liquid oxygen within the unit. This technique is cumbersome and requires relatively accurate weight determinations because the tare weight is a substantial proportion of filled container weight. For example, one commercial portable unit has a capacity of about 1.2 lb of liquid oxygen and weighs about 6.6 lb when full. A somewhat larger commercial unit has a liquid oxygen capacity of about 3.8 lb and weighs 13 lb when full.

Another approach that has been taken in the gauging of the contents of a liquid oxygen therapy unit is to provide a spring scale attachable to the unit and calibrated only over that weight range between the tare weight and full weight of the container. Such devices suffer from poor readability and resolution and require frequent adjustment. They are also bulky and frequently are carried as a separate device.

A variety of electrical gages have been proposed and used in the past. These electrical gages have employed sensors within the cryogenic container and have included variable resistance sensors, thermistors, variable capacitance sensors and the like capable of discriminating between liquid and gaseous oxygen. Appropriate circuitry is provided external to the cryogenic container to activate the sensors and to provide a read-out of the oxygen level within the container. As well as being relatively expensive and complicated, such electrical gages require routine battery changes and are prone to maintenance problems.

Although the desirability of providing an integral, simple, accurate and highly readable contents gage for use with liquid oxygen therapy units has long been recognized, no device has yet been developed which fully satisfies these needs.

SUMMARY OF THE INVENTION

A contents gage for measuring the amount of material within a closed container, especially the liquid oxygen level within a portable oxygen therapy unit, comprises a lever arm disposed across the top of the container and pivoted intermediate its ends. One end of the arm is spring biased to a tension balancing out the tare weight of the container while the other arm end acts upon a pressure transducer having a short movement or throw over that pressure range developed between an empty and full container. The pressure transducer is coupled to an indicating means calibrated to provide a direct readout of the container contents when the container is lifted by handle means attached to the lever arm.

Hence, it is an object of this invention to provide means for gauging the contents of a closed container.

It is a specific object of this invention to provide means for gauging the contents of a cryogen container.

Another specific object of this invention is to provide a method and means for accurately gauging the liquid oxygen level within a portable, liquid oxygen therapy unit.

DESCRIPTION OF THE DRAWING

A specific embodiment of the invention is illustrated in the drawing in which:

FIG. 2 is a side view of the mounting plate, lever arm and pressure transducer assembly.

FIG. 3 is a partial sectional view of the pressure transducer and indicating means sub-assembly.

FIG. 4 is a top view of the mounting plate, lever arm and indicating means.

DESCRIPTION AND DISCUSSION OF THE INVENTION

Figure 1:
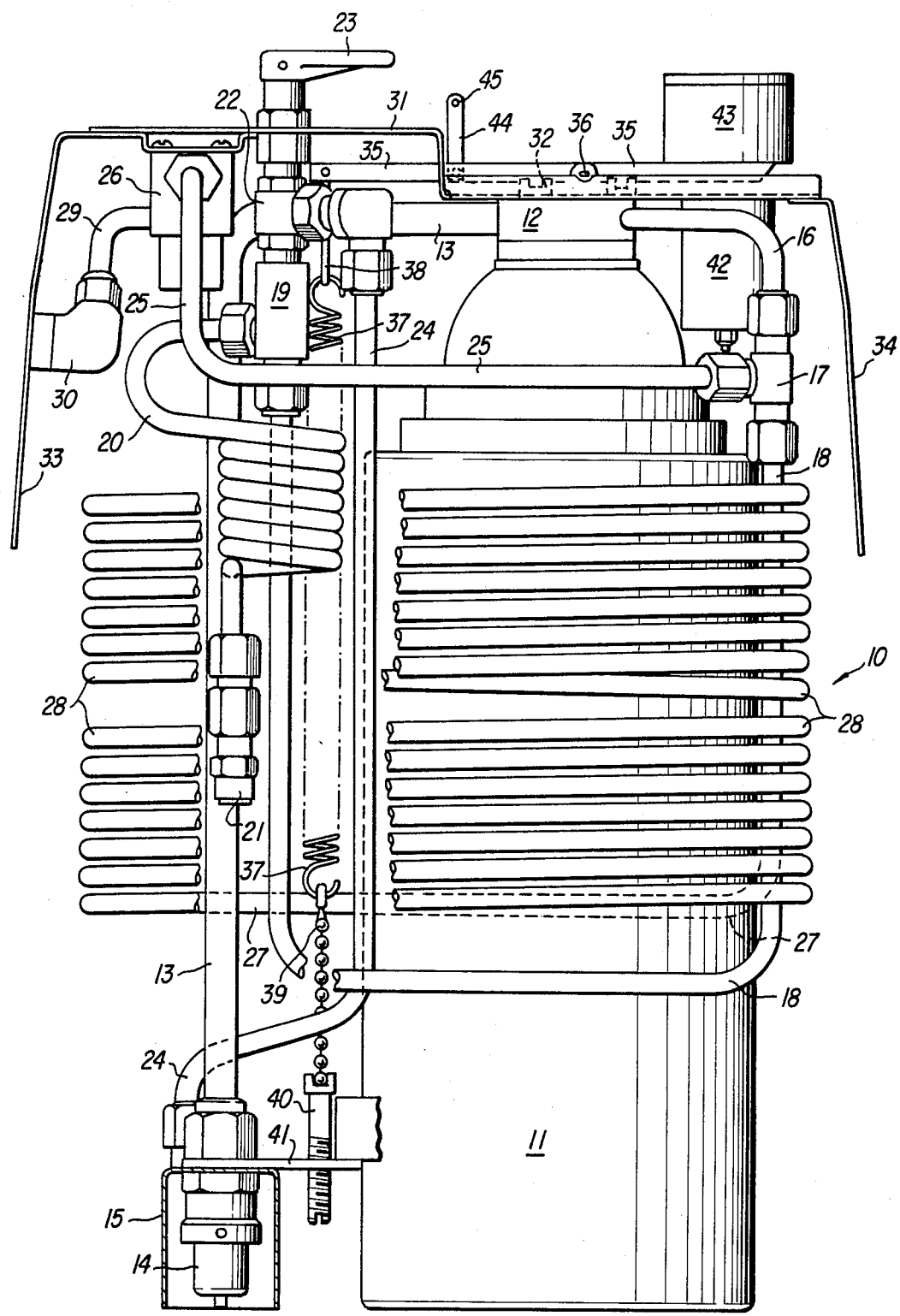
FIG. 1 is a partially cut away side view of a portable, liquid oxygen therapy unit and the contents gage of this invention.

The contents gage of this invention will be described in relation to its use with a portable, liquid oxygen therapy unit. In this embodiment, the contents gage comprises a lever arm disposed across the top of the unit and pivotally attached to a mounting plate at the top of the unit. A handle for lifting and carrying the unit is attached to the lever arm at a point between the lever arm pivot and the arm end, preferably over the center of gravity of the unit. Consequently, the gage will register whenever the unit is lifted by its handle.

The empty, or tare, weight of the unit is compensated for by spring biasing one end of the lever arm. When the container is lifted, the other arm end exerts a force on a pressure transducer proportionate to the weight of oxygen within the container. The pressure transducer, in turn, is coupled to indicating means calibrated to provide a visual indication of the fill level of the container.

Referring now to FIG. 1, there is shown an overall view of a portable, liquid oxygen therapy unit including the contents gage of this invention.

The therapy unit, shown generally at 10, comprises a liquid oxygen storage container 11 consisting of a vacuum insulated flask adapted to dispense a metered stream of oxygen. Capping the flask 11 is a closure flange 12 which serves also to port three conduits communicating with the interior of the flask. One of these conduits 13, is used to fill the flask with liquid oxygen. Conduit 13 extends downwardly to the side of flask 11 terminating in a quick connect-type coupling 14 which is connectable to a mating coupling half of a liquid oxygen supply. Preferably, coupling 14 is encircled by an open-ended, cup-like shield means 15 to prevent freezing of the coupling during liquid oxygen transfer.

A second conduit 16 opens into the top vapor space of flask 11 and leads to a tee fitting 17. Tubing 18, connecting with one leg of the tee fitting, is directed in a generally U-shaped path to a leg of a second tee 19. A branch line 20 from tee fitting 19 is coiled around a portion of tubing 18 and terminates in downwardly pointing emergency relief valve or blow-out plug 21. Plug 21 is adapted to open and vent the contents of flask 11 should pressure within the flask increase above a pre-set level; a pressure level well below that which would cause rupture of the flask itself. The other leg of tee fitting 19 leads to vent-fill valve assembly 22 having an external handle 23. Valve 22 remains in a normally closed position except during filling of flask 11 with liquid oxygen. During the filling operation, valve handle 23 is placed in the open position which vents gas from the interior of flask 11 reducing the pressure therein and allowing liquid oxygen flow into the flask. Vented gas is conducted from valve 22 through tubing 24 and preferably discharges into the top interior of shield means 15 as shown.

A second branch conduit 25 from tee fitting 17 leads to economizer valve assembly 26. The economizer valve operates as a pressure regulator maintaining a positive pressure within flask 11. Low pressure gas discharged from economizer valve 26 is led into the breathing circuit in a manner to be described.

A third conduit ports through closure flange 12 at the back side thereof and is not shown in this Figure. That third conduit is connected to a liquid withdrawal tube which extends within flask 11 to a point adjacent the bottom thereof and extends external to the flask to a tee fitting. One leg of the tee fitting accepts gas discharged from economizer valve 26 to merge with vaporizing liquid oxygen from the flask. This merged stream is then directed downwardly through tubing 27 to the bottom of warming coil assembly 28 which warming coil assembly comprises an extension of tubing 27 wrapped in a generally helical fashion around the flask 11. The upper end of warming coil 28 terminates in a flow rate selector valve (not shown) located in back of economizer valve 26. Oxygen flowing from the flow rate selector valve is conveyed by way of tubing 29 to outlet fitting 30 which is connectable to a breathing mask or cannula supply tube for breathing by the user.

Vacuum flask 11 is typically constructed of stainless steel as glass is too fragile for satisfactory use. As can readily be appreciated by viewing the construction of a portable oxygen therapy unit as depicted in FIG. 1, the weight of the flask and its associated coils and controls is large compared to the weight of liquid oxygen which can be accommodated within the flask. In actual practice, the weight of liquid oxygen in a portable, liquid oxygen therapy unit comprises some 20% to 30% of the total weight of the filled unit. Hence, the difficulties involved in obtaining an accurate measurement of the oxygen level within the flask by differential weighing is evident.

In this embodiment of the invention wherein the contents gage is used to provide a measure of the liquid oxygen level within an insulated flask, the gage mechanism may be arranged as shown. A mounting plate 31 is secured to closure flange 12 as by screw fasteners 32. Extension brackets 33 and 34 on either end of plate 31 serve to secure the therapy unit within a case (not shown). The gage mechanism comprises a lever arm 35 pivotally mounted on plate 31 at pivot point 36. A tare spring 37 is attached to one end of arm 35 through spring hanger 38 and exerts a downward tension upon that end of arm 35. Spring 37 must have a configuration such that the spring exerts an relatively constant force or tension upon the lever arm over a relatively short movement or throw of the lever arm. This result may conveniently be obtained through use of a helically coiled spring having a working coil length which is long compared to the maximum movement of the lever arm. The bottom end of spring 37 is secured to lower spring hanger assembly 39 which in turn is connected to a spring tension adjustment means which may comprise a threaded adjustment screw 40 threadably inserted into bracket member 41 as shown.

A pressure transducer 42 and indicating means 43 are mounted on the other end of lever arm 35. Both the transducer and the indicating means will be described in greater detail in relation to FIGS. 2-4. A lift point conveniently comprising handle attachment member 44 is provided intermediate the tare spring end of arm 35 and pivot point 36. It is advantageous and preferred that handle attachment member 44 be located at a point on or in close proximity to a vertical line passing through the center of gravity of the unit. In this way, a carrying handle for the unit may be attached to member 44 by means of a pin inserted through hole 45 thus providing a measure of the oxygen level within flask 11 upon lifting of the unit. Placement of the handle above the center of gravity of the unit allows the unit to hang naturally in a vertical attitude.

Referring now to FIGS. 2 and 3, FIG. 2 is a side view of the mounting plate, lever arm and transducer assembly separated from the liquid oxygen therapy unit while FIG. 3 illustrates details of the transducer and contents level indicating means sub-assembly. Lever arm 35 my conveniently comprise a channel member formed of sheet steel or similar material. It necessarily must be of sufficient stiffness to preclude bending under the loads applied. Indicating means 43 is rigidly mounted to arm 35 as by mounting screw 46. Means 43 preferably comprises a liquid-filled Bourdon tube gage of the type conventionally used to indicate pressure.

As shown in partial cross-section in FIG. 3, transducer means 42 may comprise a liquid filled, bellows-type load cell or pressure transducer 47 rigidly coupled to and in fluid communication with Bourdon tube gage 43 through nipple 48. Transducer 47 is disposed within a cup-shaped member 49 which in turn is contained within housing 50. Member 49 is free to move vertically within housing 50 while housing 50 is rigidly attached as by brazing to plate 31. Adjustment means are provided to remove all backlash or play from the lever arm 35 and pivot point 36. Such adjustment means may comprise a screw 51 threaded through a nut 52 centrally attached to the bottom of housing 50. The end of screw 51 bears upon the bottom of member 49 through plate 53 to provide vertical adjustment thereof.

FIG. 4 is a top view of the mounting plate and lever arm assembly. As is shown in the Figure, pivot point 36 of arm 35 may be formed by punching ear member 54 from plate 31 and bending them upward perpendicular to plate 31. Gage 43 is provided with suitable, calibrated indicia 55 to provide a visual readout of the level of liquid oxygen within the flask.

Pressure transducer 42 has been illustrated and described as comprising a liquid-filled, bellows-type load cell 47 connected to and communicating with a liquid filled Bourdon tube pressure gage. Other types of liquid-filled load cells may be used as well including those of the flat or corrugated diaphram type, those of the aneroid type consisting of two corrugated diaphrams sealed together, and load cells of other configuration which produce an equivalent result. Pressure transducer of the capacitive, resistive, inductive and piezoelectric types can be used as well. However, these last named pressure transducers are less preferred for use with liquid oxygen containers because they require additional electronic circuitry thus increasing the cost, complexity and, in some instances the hazards, of the gauging system.

One property that all appropriate pressure transducers must have in common in that of translating a small vertical movement of the end of lever arm 35 into a full scale indication of the contents of flask 11; that is, from empty to full. As can be appreciated from the drawing, particularly FIG. 2, lifting the container through handle attachment means 44 produces an upward force on lever arm 35 at that point. Tare spring 37 is adjusted to exert a downward force on one end of arm 35 equal to the upward force applied when lifting the container in an empty state through attachment means 44. The geometry of lever arm 35, in particular the location of pivot point 36, is set to provide a full scale reading of gage 43 when flask 11 is full and the unit is lifted through means 44. Under these conditions, the tare spring end of arm 35 is caused to move upwardly a short distance while the opposite end of the arm moves downwardly placing a compressive force upon the load cell. Compression of the liquid within the load cell in turn causes the Bourdon tube gage to register a value which is a direct measure of the differential weight of the unit attributable to the weight of liquid oxygen within flask 11.

In order to obtain an accurate and linear readout of the contents weight, it is necessary that tare spring 37 have a very low spring rate or force constant. This requirement can better be understood by consideration of Hooke's law which, when applied to a spring under tension, states that the force exerted by the spring is equal to the extension of the spring multiplied by a constant referred to as the force constant of the spring. As can be seen from this mathematical relationship, if one were to extend a spring having a low or small force constant for a short distance, the force exerted by the spring would remain substantially constant. By proper choice of the pressure transducer and gage, it is possible to obtain a full scale deflection of the gage with a very small movement of the lever arm. Thus, the distance that tare spring 37 is extended between an empty and a full condition of the flask can be made very small. A low spring force constant can be obtained through use of a relatively long coiled spring. In practical terms, working length of the tare spring should be at least about 10 times its extension from an empty to a full condition of the flask and preferably should have a length to extension ratio of 30 or more.

The contents gage of this invention as described and illustrated allows the gauging or measurement of the contents within a closed container through simple mechanical means while automatically compensating for the tare weight of the container. It provides an expanded scale or visual readout of the contents compared to other gauging systems, is light in weight and is easily adaptable as an integral inclusion with portable cryogen containers. No external power is required to operate the gage and it is completely safe with liquid oxygen systems.

While the contents gage of this invention has been described specifically in relation to portable, liquid oxygen therapy systems, its use is not so limited. Many other applications of this gauging system will be apparent to those skilled in the art including use with other cryogens or with toxic or hazardous liquids dispensed from a closed container. Such other applications may be employed without departing from the spirit and scope of this invention as defined by the appended claims.

I claim:

1. A portable, liquid oxygen therapy unit including contents gauging means comprising:
    flask means adapted to contain and store a quantity of liquid oxygen;
    means to vaporize and deliver a metered stream of oxygen to a user;
    a mounting plate fixedly attached to the top of said flask means;
    a lever arm pivotally attached to said plate at a pivot point intermediate the arm ends;
    spring means attached to one lever arm end and extending between said lever arm end and an attachment point in a lower portion of said unit, said spring means adapted to bias said lever arm end in a downward direction;
    pressure transducer means disposed at the other lever arm end and adapted to indicate an increased pressure upon downward movement of said other arm end;
    indicating means operatively connected to said pressure transducer and calibrated to show the level of liquid oxygen within said flask as a function of pressure indicated by said transducer, and
    handle means attached to said lever arm at a point intermediate the spring-attached lever arm end and the pivot point of said lever arm whereby lifting said therapy unit by said handle means causes said indicating means to provide a visual readout of the level of liquid oxygen contained within said flask.

2. The unit of claim 1 wherein said handle means are attached to said lever arm at a point on, or in close proximity to, a vertical line passing through the center of gravity of said unit.

3. The unit of claim 1 wherein said pressure transducer means comprise a hydraulic pressure transducer.

4. The unit of claim 3 wherein said hydraulic pressure transducer comprise a liquid-filled load cell.

5. The unit of claim 4 wherein said indicating means comprise a liquid-filled, Bourdon tube pressure gage.

6. The unit of claim 5 wherein said load cell is coupled to and is in fluid communication with said Bourdon tube pressure gage.

7. The unit of claim 6 wherein said load cell is a bellows-type load cell.

8. The unit of claim 3 wherein said pressure transducer is disposed within a cup-shaped member placed within a housing, said housing rigidly attached to said plate member.

9. The unit of claim 8 wherein said cup-shaped member is free to move vertically within said housing and wherein means are provided to adjust the position of said cup-shaped member within said housing.

10. The unit of claim 1 wherein said spring means comprise a helically coiled spring having a working length substantially greater than ten times its extension from an empty to a full flask condition.

11. The unit of claim 2 wherein the tension on said spring member is adjustable and is set to a level whereat said indicating means register a zero value when said flask is empty and said unit is lifted by said handle means.

12. A means for gauging a relatively small weight of fluid contained in a portable relatively heavy container comprising:

a lever arm extending across the top of said container and pivotally attached to said container at a point intermediate the lever arm ends;

spring means attached to and biasing one end of said lever arm;

lifting means for said container attached to said lever arm at a point intermediate its ends but removed from said pivot point;

pressure transducer means disposed at the other end of said lever arm, said transducer means arranged to indicate an increased pressure when said container is lifted by the lifting means, and indicating means displaying a visual measure of the fluid contents of said container as a function of said increased pressure.

13. The means of claim 12 wherein said transducer means is an electrical transducer.

14. The means of claim 13 wherein said electrical transducer is selected from the group consisting of capacitative, resistive, inductive and peizoelectric transducers.

15. The means of claim 12 wherein said lever arm is pivoted to a mounting plate attached to said container.

16. The means of claim 15 wherein said spring means downwardly bias said lever arm end and wherein said lifting means are attached to said lever arm at a point intermediate said spring biased end and said pivot point.

17. The means of claim 16 wherein said transducer means comprise a hydraulic load cell.

18. The means of claim 17 wherein said load cell is disposed within a cup-shaped member placed within a housing, said housing rigidly attached to said mounting plate.

19. The means of claim 18 wherein said cup-shaped member is movable vertically within said housing and wherein means are provided to adjust the position of said cup-shaped member within said housing.

20. The means of claim 17 wherein said indicating means comprise a liquid-filled, Bourdon tube pressure gage.

21. The means of claim 20 wherein said load cell is coupled to and is in fluid communication with said Bourdon tube pressure gage.

22. The means of claim 21 wherein the force exerted by said spring is set to a level whereat said indicating means register a zero value when said container is empty and is lifted by said lifting means.

23. The means of claim 12 wherein said spring means comprise a helically coiled spring having a working length substantially greater than ten times the spring extension from an empty to a full condition of the container.

24. The means of claim 12 wherein said container is adapted to hold and to store a cryogen.

25. A method for gauging a relatively small weight of fluid confined within a portable relatively heavy container, comprising:

extending a lever arm across the top of said container and pirotally attaching said arm to said container at a pivot point intermediate the arm ends;

providing a substantially constant biasing force acting downwardly upon one end of said arm;

lifting said container through said lever arm by applying an upward force to a point on that arm intermediate the downwardly biased arm end and the pivot point of said arm;

sensing the force exerted by the other end of said arm when said container is lifted, and translating said sensed force into visual indicia representative of a liquid level of the fluid in said container.

26. The method of claim 25 wherein said biasing force is set to a level whereat the force exerted by the other arm end is essentially zero when said container is empty and is lifted through said lever arm.

* * * * *